Dec. 12, 1961 A. L. RICH 3,013,213
JITTERLESS PULSE DELAYER USING A SYNCHRONIZED
DELAY CIRCUIT AND DUO-TRIODE GATE
Filed June 17, 1958
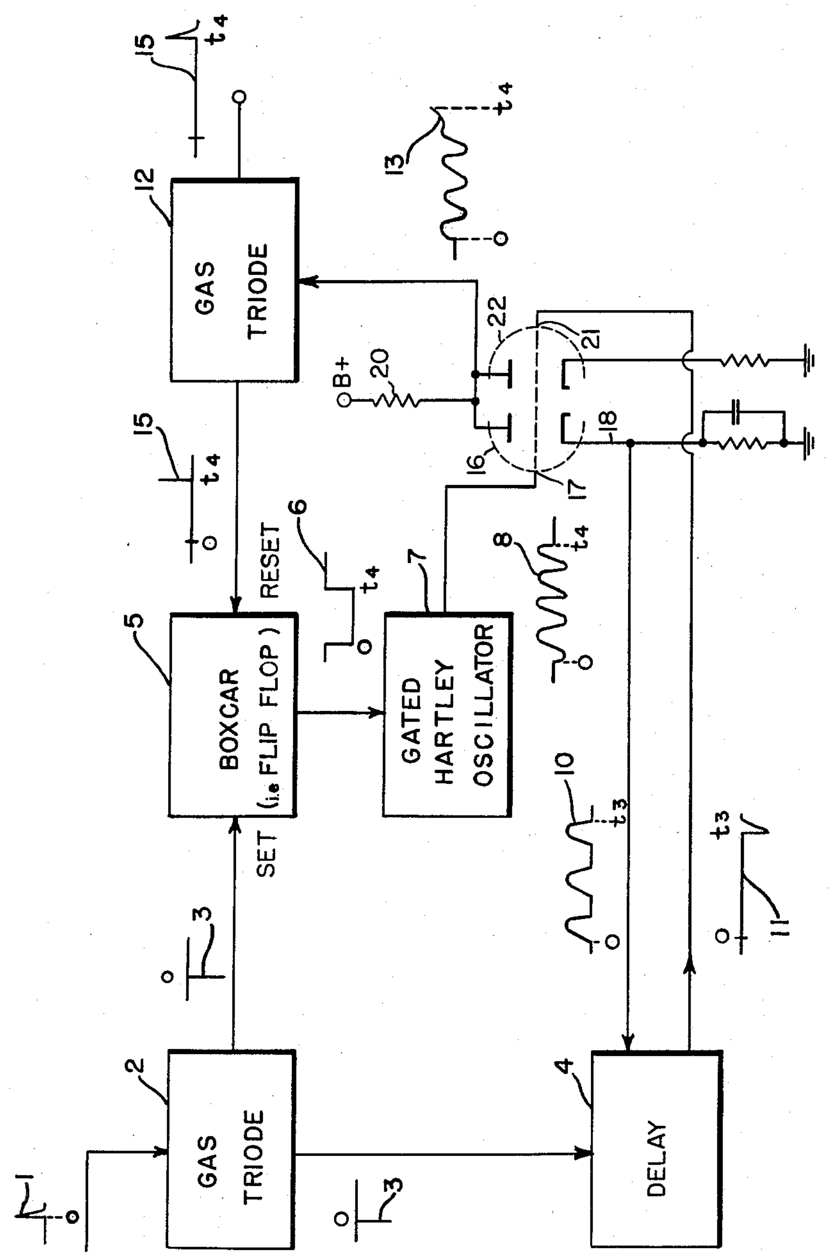
INVENTOR.
ALAN L. RICH
BY Wade Koontz
George Fine
ATTORNEYS United States Patent Office 3,013,213
Patented Dec. 12, 1961

3,013,213

JITTERLESS PULSE DELAYER USING A SYNCHRONIZED DELAY CIRCUIT AND DUO-TRIODE GATE

Alan L. Rich, Levittown, N.Y., assignor to the United States of America as represented by the Secretary of the Air Force Filed June 17, 1958, Ser. No. 742,696
2 Claims. (Cl. 328—177)

The present invention relates to a system for providing a delay interval and more particularly a system providing a precise delay interval with a high degree of jitter stability over a wide range of delay intervals.

In a wide variety of electronic systems such as the MTI radar and digital computers, delay systems have great utility. In these electronic systems, it is required that two events occur in a definite time relationship to each other. The times involved are usually marked by short pulses (or sudden changes in amplitude).

In an MTI system the Doppler effect is utilized to eliminate permanent echoes while preserving echoes from a moving target. The phase of the echo signal is compared in a phase detector with the phase of a reference oscillator so operated that its phase is related in a definite way to the phase of the transmitted pulse. In such a system, the permanent echoes have the same relative phase from pulse to pulse, and so produce a phase-detector output that is identical for successive pulses. Consequently, by subtracting the phase-detector output for the first pulse from that for the second, ec., the permanent echoes are cancelled. The phase-detector outputs for successive pulses are subtracted from each other by employing a delay system which provides a delay corresponding exactly to the interval between successive pulses. Thus when an echo is received from a particular target due to the last transmitted pulse, the output of the delay system is delivering an echo from the same target corresponding to the phase-detector output produced by the next-to-last transmitted pulse. The delayed and undelayed echoes are then subtracted. Therefore, a system which provides a precise delay interval with a high degree of jitter stability over a wide range of delay intervals is of great utility in an MTI system.

In accordance with the present invention a system is provided which is actuated by a pulse. The system then generates an output signal which is delayed in time as measured against the actuating signal. The generated delayed pulse is synchronized to provide a jitterless delayed pulse. The jitterless delayed pulse is utilized to automatically provide a further preselected delay and also in a feedback loop to control the aforementioned synchronization. The time delay provided by the aforesaid system covers a wide range and the output signal has a high degree of jitter stability.

The invention will be better understood from the following description considered in connection with the accompanying drawing in which gas triode 2 is fired by actuating positive pulse 1. Actuating positive pulse 1 starts at time 0. When gas triode 2 conducts upon receipt of pulse 1, it generates a negative pulse 3 also starting at time 0. Pulse 3 simultaneously triggers delay 4 and boxcar generator 5. Delay 4, for example, may be a conventional phantastron circuit such as described and illustrated in "Radiation Laboratory Series", vol. 20, pages 94, 121, 161–171, published by McGraw-Hill in 1949. Boxcar generator 5 is conventional and one of its advantages is that it furnishes a filter action that completely suppresses the PRF and all its harmonics.

Upon receipt of negative pulse 13, boxcar generator 5 provides a negative going output pulse 6 starting at time 0. Boxcar pulse 6 is fed to gated Hartley oscillator 7 thereby actuating oscillator 7 during the period of pulse 6 to provide sinusoidal oscillations 8 which are utilized to energize twin triode rectifier and pulse gate 9. Sinusoidal signal 8 also starts at time 0.

Twin triode rectifier and pulse gate 9 is preferably comprised of a twin triode having a common plate resistor 20. Sinusoidal signal 8 is fed to the grid 17 of the first triode 16. Rectified signal 10 appears on the cathode 18 of the first triode 16, signal 10, as ilustrated in the drawing, is achieved by the limiting action provided by triode 16. Aforesaid limiting action is achieved in a conventional fashion such as shown and described on pages 164–169 of Radar Fundamentals (TM 11–466) published by the U.S. War Department, June 29, 1944. Signal 10 is utilized to synchronize delay 4. This is achieved in the following manner: delay 4 is adjusted so that initially the pulse generated thereby is delayed coarsely approximately for a period of time equal to $t_3$; thereupon rectified signal 10 can only be utilized exclusively at time, $t_3$, to synchronize the output signal from delay 4 at time, $t_3$. The coarse selection of the time delay and the subsequent synchronization thereof is illustrated and described by the conventional pulse-selecting phantastron of Figure 6.39 and the legend thereunder, such figure being shown on page 171 of aforementioned vol. 20 of the Radiation Lab. Series. Pulse 11, initiated at time $t_3$, is applied to the grid 21 of the second triode 22 in twin triode rectifier and pulse gate 9, cutting off said second triode 22 and raising the plate voltage of the first triode 16 sufficiently to enable gas triode 12 to be triggered on the next cycle 13 at time $t_4$ to provide output pulse 15 at time $t_4$, substantially free of jitter. As waveform C in Fig. 6.36 of page 169 of vol. 20 of the Radiation Lab. Series shows, pulse 11 is wide enough to keep the plate voltage of triode 16 raised until the occurrence of the next positive sinusoidal excursion 13 at time $t_4$. Pulse 15 at time $t_4$, applied to boxcar generator 5, is effective in terminating pulse 6 which gates oscillator 7 off.

Many variations and modifications of the invention will occur to those skilled in the art to which the invention relates, and it is accordingly intended that the claims that follow shall not be limited, but only illustrated, by the details of the preferred embodiment of the invention shown and described herein.

What is claimed is:

1. A system for generating a time delay comprising a first gas triode adapted to receive an actuating input pulse, delay means and a boxcar generator simultaneously being triggered by the output signal from said first gas triode, said boxcar generator generating an output rectangular pulse upon being triggered sinusoidal oscillator means gated on by said rectangular pulse, a twin triode having dual inputs and outputs, one of the said inputs receiving sinusoidal signals from said gated oscillator, and one of said outputs delivering a rectified output signal in the form of evenly spaced series of pulses of uniform polarity and means for causing pulses of said series to control said triggered delay means thereby providing output pulses therefrom delayed an integral multiple of the period of said sinusoidal oscillator, said output pulses from said delay means being delivered to the other of said inputs of said twin-triode.

2. A system for generating a time delay as defined in claim 1 further including a second gas triode generating a pulse upon being rendered conductive by a control signal received from the other of said outputs of said twin triode, said control signal resulting from a coincidence in said twin triode between the output pulse of said delay means and the signal from said sinusoidal oscillator and means for causing said sinusoidal oscillator to be gated off in response to said pulse from said second gas triode.

References Cited in the file of this patent

UNITED STATES PATENTS

| | | |
|---|---|---|
| 2,543,072 | Stearns | Feb. 27, 1951 |
| 2,716,236 | Reinish et al. | Aug. 23, 1955 |

OTHER REFERENCES

Pub. 1—"Principles of Radar," Reintjes and Coate, McGraw-Hill, 1952, pages 439–441.

Pub. 2—"Electronic Time Measurements," Chance et al., McGraw-Hill, 1949, pages 94, 121, 161–171.